(12) United States Patent
Ding et al.

(10) Patent No.: US 11,460,660 B2
(45) Date of Patent: Oct. 4, 2022

(54) LENS HOLDER HAVING AIR ESCAPE HOLE, CAMERA MODULE, AND ELECTRONIC DEVICE

(71) Applicant: TRIPLE WIN TECHNOLOGY(SHENZHEN) CO.LTD., Shenzhen (CN)

(72) Inventors: Sheng-Jie Ding, Guangdong (CN); Shin-Wen Chen, New Taipei (TW); Jing-Wei Li, Guangdong (CN); Jian-Chao Song, Guangdong (CN); Shuai-Peng Li, Shenzhen (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 118 days.

(21) Appl. No.: 16/860,450

(22) Filed: Apr. 28, 2020

(65) Prior Publication Data

US 2021/0302683 A1    Sep. 30, 2021

(30) Foreign Application Priority Data

Mar. 26, 2020  (CN) .......................... 202010225886.5

(51) Int. Cl.
*G02B 7/02* (2021.01)
*G03B 11/00* (2021.01)

(52) U.S. Cl.
CPC ................ *G02B 7/02* (2013.01); *G03B 11/00* (2013.01)

(58) Field of Classification Search
CPC .......... G02B 7/02; G02B 7/028; G02B 7/021; G02B 7/022; G02B 7/006; G02B 7/1815; G02B 3/00; G02B 13/003; G02B 13/18; G02B 27/00; G02B 27/0006; H04N 5/225; H04N 5/2252; H04N 5/2253; H04N 5/2254; G03B 11/00; G03B 11/041
USPC ....... 359/819, 723, 511, 512, 811, 826, 827, 359/830; 369/112.23, 112.24, 112.22
See application file for complete search history.

(56) References Cited

U.S. PATENT DOCUMENTS

2020/0049936 A1*   2/2020  Wei ........................ G02B 7/028

FOREIGN PATENT DOCUMENTS

| CN | 105093461 A | 11/2015 |
|----|-------------|---------|
| CN | 107864327 A | 3/2018 |
| CN | 209402597 U | 9/2019 |
| NO | 2019/015692 A1 | 1/2019 |

* cited by examiner

*Primary Examiner* — Jie Lei
(74) *Attorney, Agent, or Firm* — ScienBiziP, P.C.

(57) ABSTRACT

A lens holder with an air escape hole which cannot be fouled by adhesive includes a holder body and a lens barrel disposed on the holder body. The holder body includes a first surface away from the lens barrel and a second surface opposite to the first surface, the first surface defines a groove. The groove includes a first bottom surface, the first bottom surface defines a recess. The recess includes a second bottom surface, the second bottom surface defines an air escape hole. A cross-sectional size of the air escape hole is less than a cross-sectional size of the recess.

3 Claims, 7 Drawing Sheets

LENS HOLDER HAVING AIR ESCAPE HOLE, CAMERA MODULE, AND ELECTRONIC DEVICE

FIELD

The subject matter relates to imaging devices, and more particularly, to a lens holder, a camera module having the lens holder, and an electronic device having the camera module.

BACKGROUND

Camera modules may include lens unit, lens holders, optical filters, sensors, and circuit boards. The different components of the camera module may be bonded together by thermosetting adhesive. The thermosetting adhesive is solidified during a heating process, but the heating process may cause the air inside the camera module to expand. Thus, the lens holder may need an air escape hole, which allows the expanded air to escape out of the camera module.

The thermosetting adhesive should not be applied on the air escape hole so that that a bonding area between the optical filter and the lens holder may be decreased. Thus, the bonding strength between the optical filter and the lens holder is decreased. When the camera module is subjected to an external force, the optical filter may be disengaged from the lens holder. Furthermore, the thermosetting adhesive may be squeezed into the air escape hole to block the air escape hole, and expanded gas cannot escape out of the camera module, thus affecting the quality of the camera module.

Therefore, there is room for improvement in the art.

BRIEF DESCRIPTION OF THE DRAWINGS

Implementations of the present technology will now be described, by way of example only, with reference to the attached figures.

DETAILED DESCRIPTION

Figure 1:
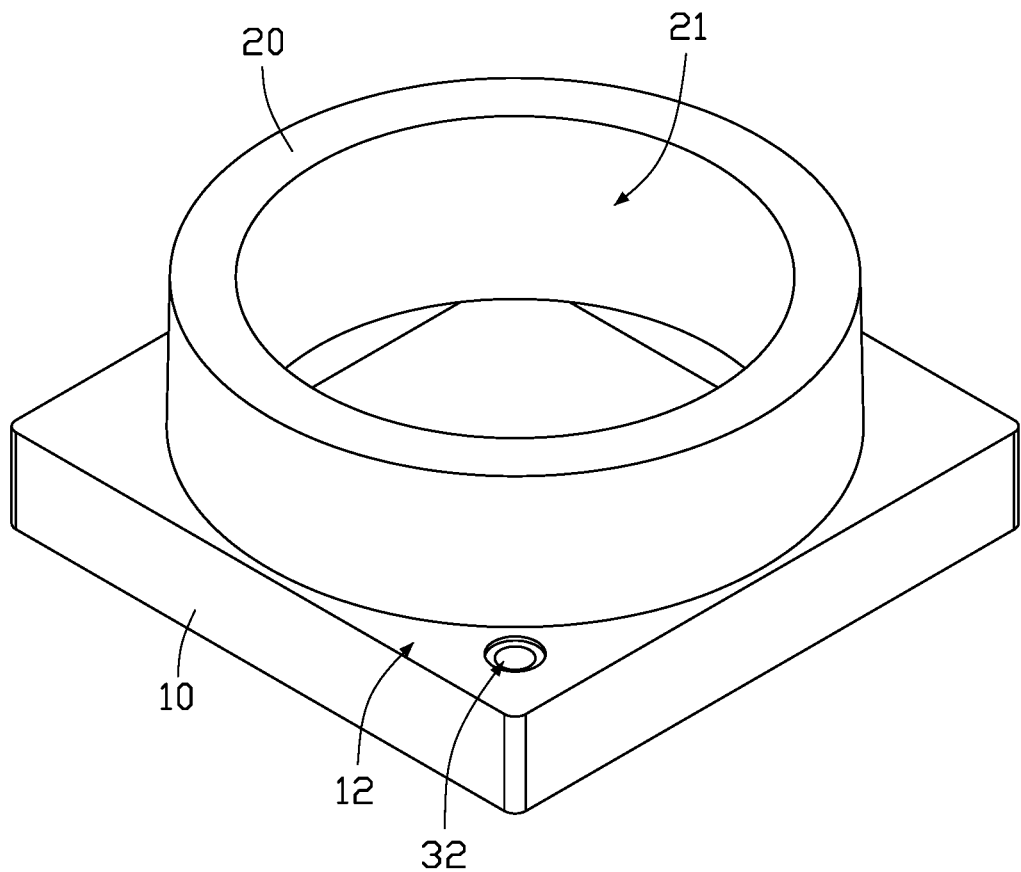
FIG. 1 is an isometric view of a lens holder according to an embodiment of the present disclosure.

It will be appreciated that for simplicity and clarity of illustration, where appropriate, reference numerals have been repeated among the different figures to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 2:
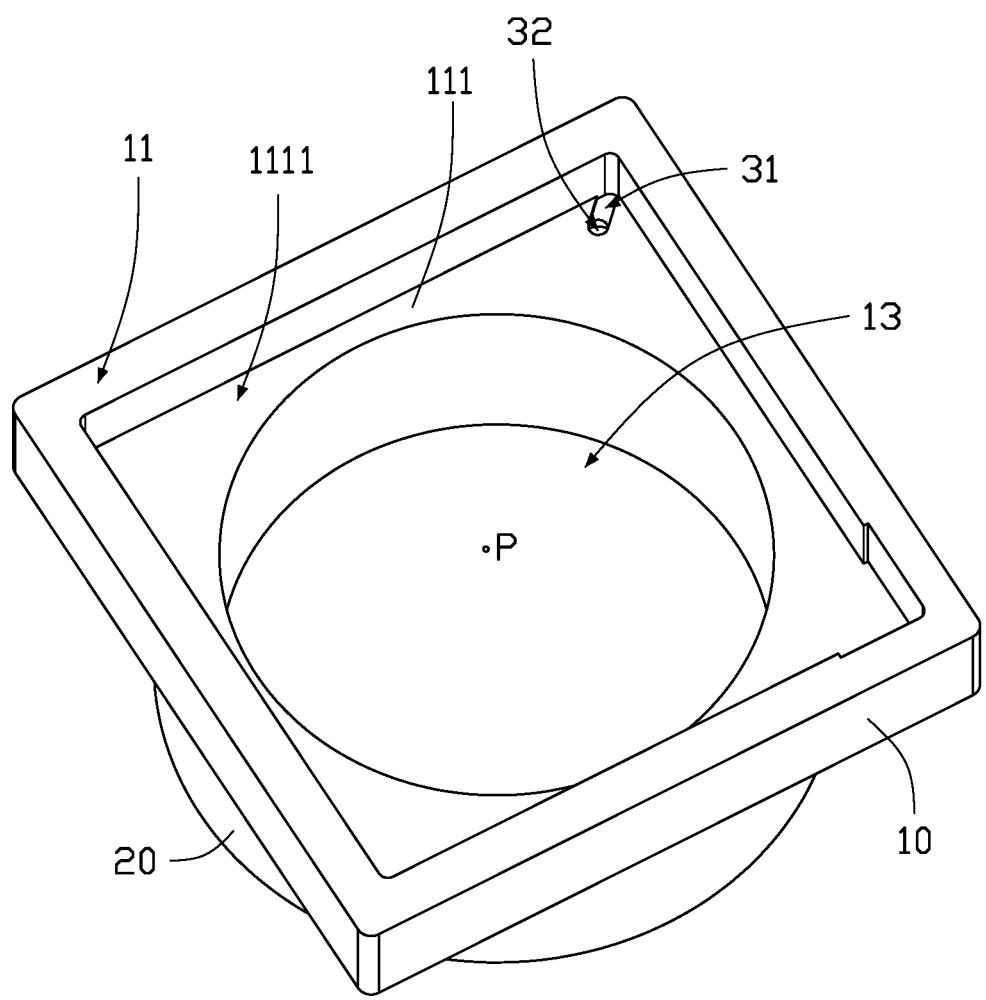
FIG. 2 is similar to FIG. 1, but showing the lens holder from another angle.
Figure 3:
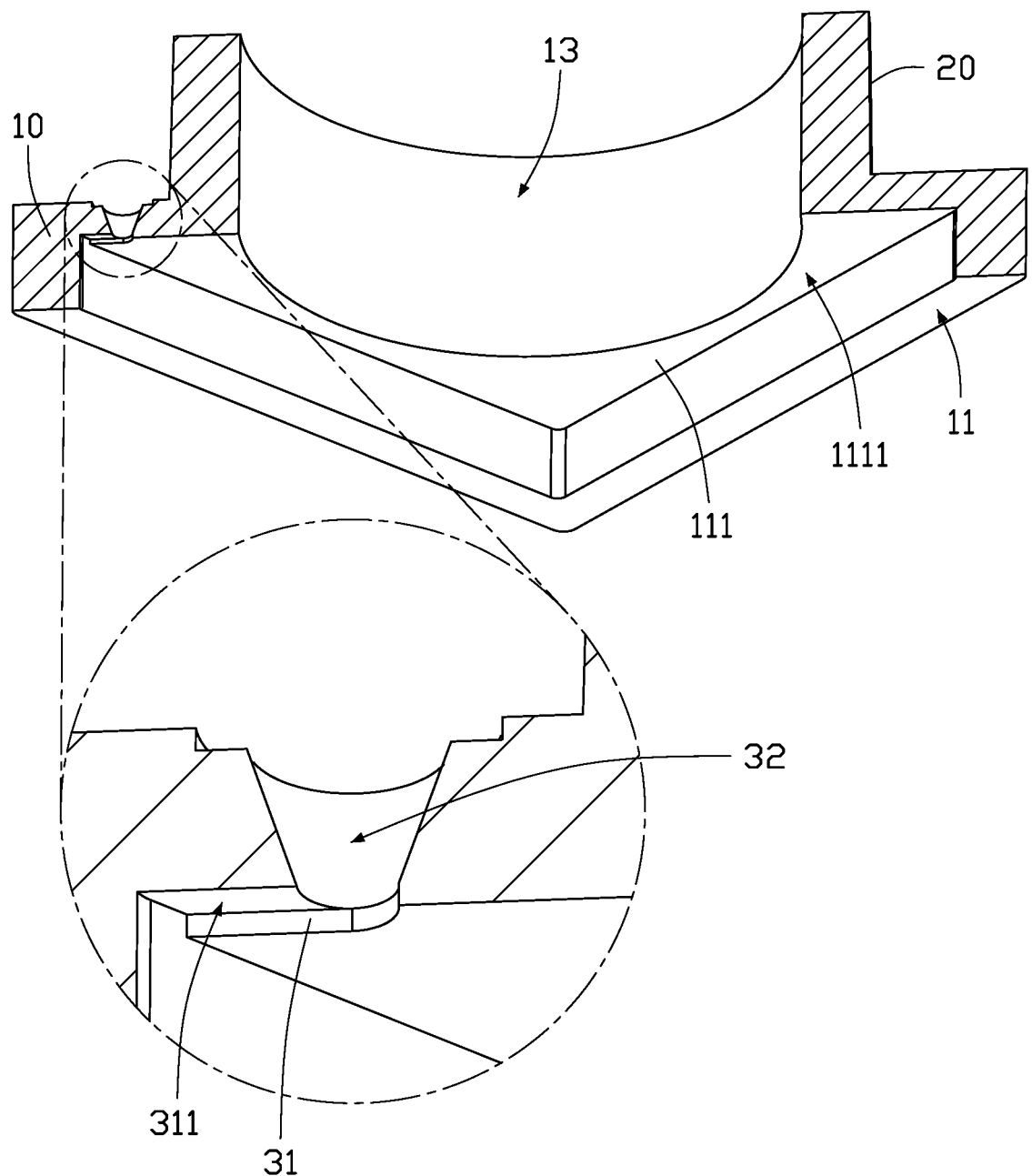
FIG. 3 is a cross-sectional view of the lens holder of FIG. 1.

Referring to FIGS. 1 to 3, an embodiment of a lens holder 100 is provided. The lens holder 100 includes a holder body 10 and a lens barrel 20 disposed on the holder body 10. The holder body 10 includes a first surface 11 away from the lens barrel 20 and a second surface 12 opposite to the first surface 11. The first surface 11 defines a groove 111. The groove 111 includes a first bottom surface 1111. The first bottom surface 1111 defines a recess 31. The recess 31 includes a second bottom surface 311. The second bottom surface 311 defines an air escape hole 32, which penetrates the second bottom surface 311 and the second surface 12. A cross-sectional size of the air escape hole 32 is less than a cross-sectional size of the recess 31.

Figure 4:
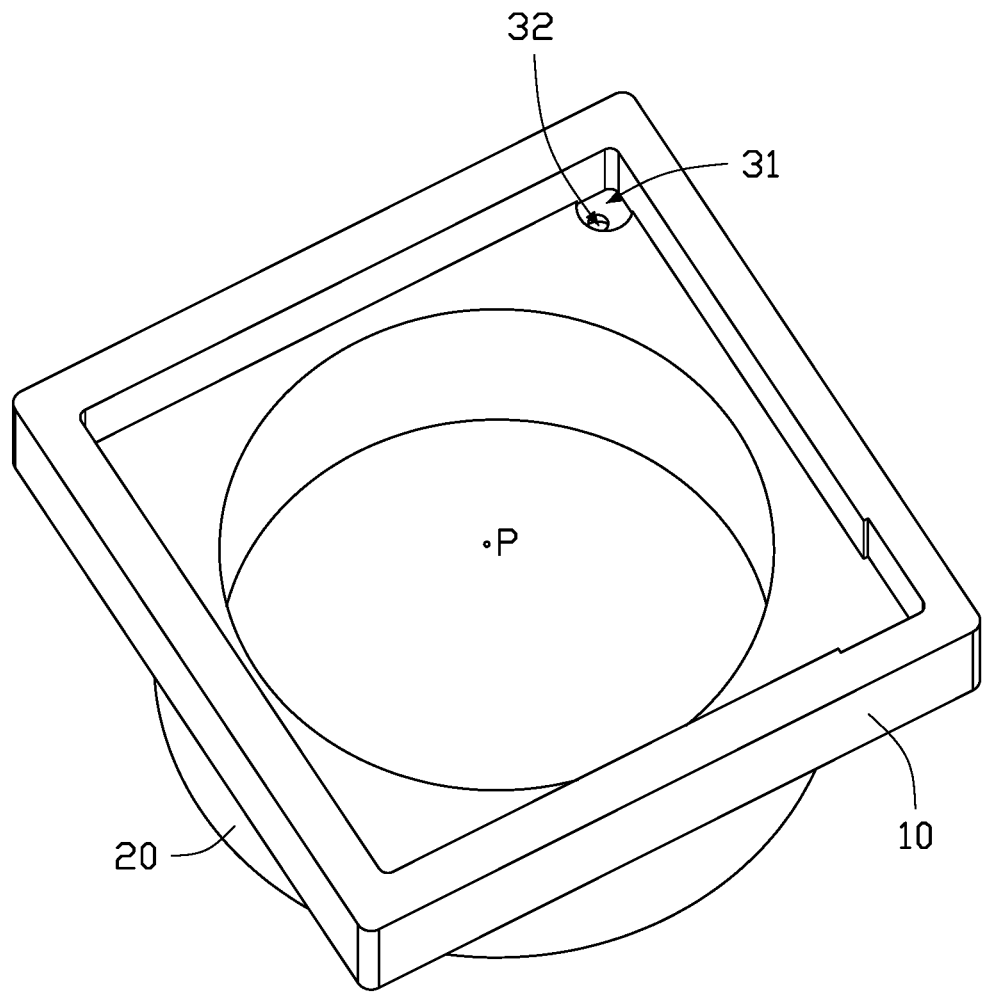
FIG. 4 is an isometric view of a lens holder according to another embodiment of the present disclosure.

By making the cross-sectional size of the recess 31 larger than the cross-sectional size of the air escape hole 32, an adhesive applied on the lens holder 100 may flow into the recess 31 beside the air escape hole 32, leaving the air escape hole 32 unblocked by the adhesive. Furthermore, when an optical filter 203 (shown in FIGS. 4 and 5) is glued to the groove 111, adhesive which flows or may have flowed into the recess 31 beside the air escape hole 32 increases the bonding area between the optical filter 203 and the lens holder 100. Thus, the bonding strength between the optical filter 203 and the lens holder 100 is improved.

In the embodiment, the holder body 10 is substantially square, and the lens barrel 20 is substantially cylindrical. An orthogonal projection of the lens barrel 20 on the holder body 10 is in a center region of the second surface 12. A center P of the orthogonal projection of the lens barrel 20 overlaps with a center of the holder body 10. The recess 31 is disposed at a corner of the holder body 10 away from the center P. Therefore, most of the adhesive may be applied on the first bottom surface 1111 of the groove 111 beside the recess 31. Thus, an interruption in the bonding region between the optical filter 203 and the lens holder 100 is avoided, thereby increasing the attachment between the optical filter 203 and the lens holder 100.

In the embodiment, the holder body 10 includes one recess 31 and one air escape hole 32. In other embodiments, the numbers of the recesses 31 and the air escape holes 32 is not limited. For example, the holder body 10 may define one recess 31 and one air escape hole 32 at each corner.

In the embodiment, referring to FIG. 2, the recess 31 is substantially rectangular, which extends diagonally along the first bottom surface 1111. The air escape hole 32 is disposed at an end of the recess 31 facing the center P. In another embodiment, referring to FIG. 4, the recess 31 may also be fan-shaped.

In the embodiment, referring to FIG. 3, the air escape hole 32 is substantially a frustum of a cone. The cross-sectional size of the air escape hole 32 gradually increases from the second bottom surface 311 to the second surface 12. In other embodiments, the air escape hole 32 may also have other shapes.

In the embodiment, referring to FIGS. 1 to 3, the lens barrel 20 defines a through hole 21. The holder body 10 defines an opening 13, which penetrates the first bottom surface 1111 and the second surface 12 and connects to the through hole 21.

In the embodiment, the holder body 10 and the lens barrel 20 are integrally formed by an injection molding process. In other embodiments of the present disclosure, the holder body 10 and the lens barrel 20 may be assembled together by gluing or riveting.

Figure 5:
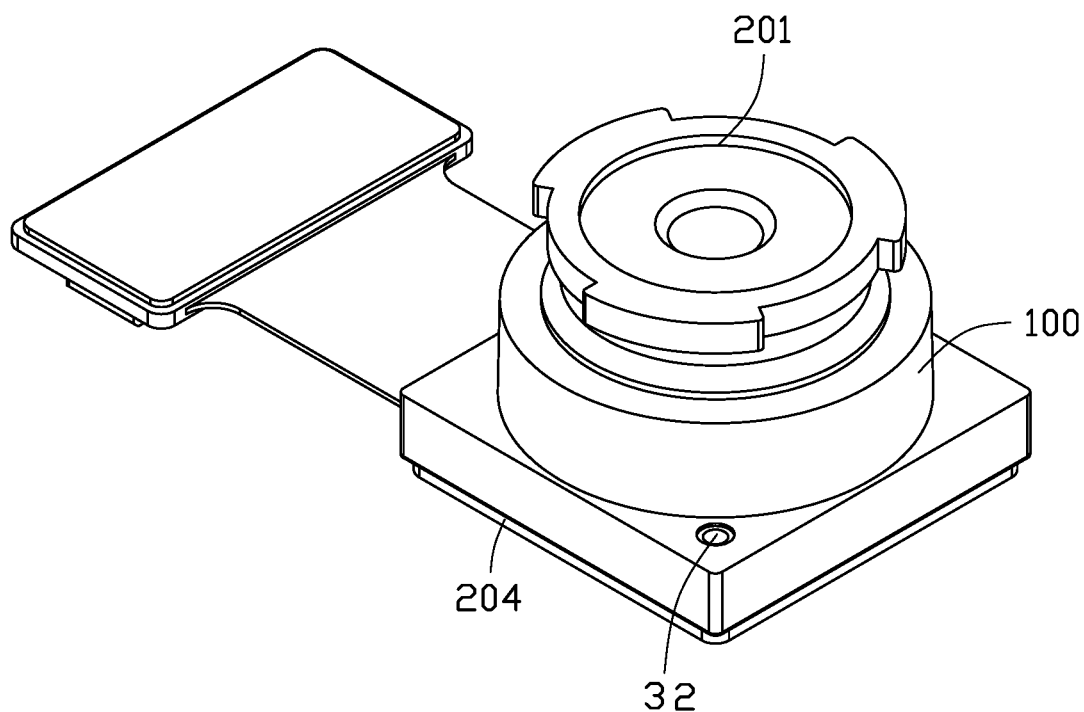
FIG. 5 is an isometric view of a camera module including the lens holder of FIG. 1.
Figure 6:
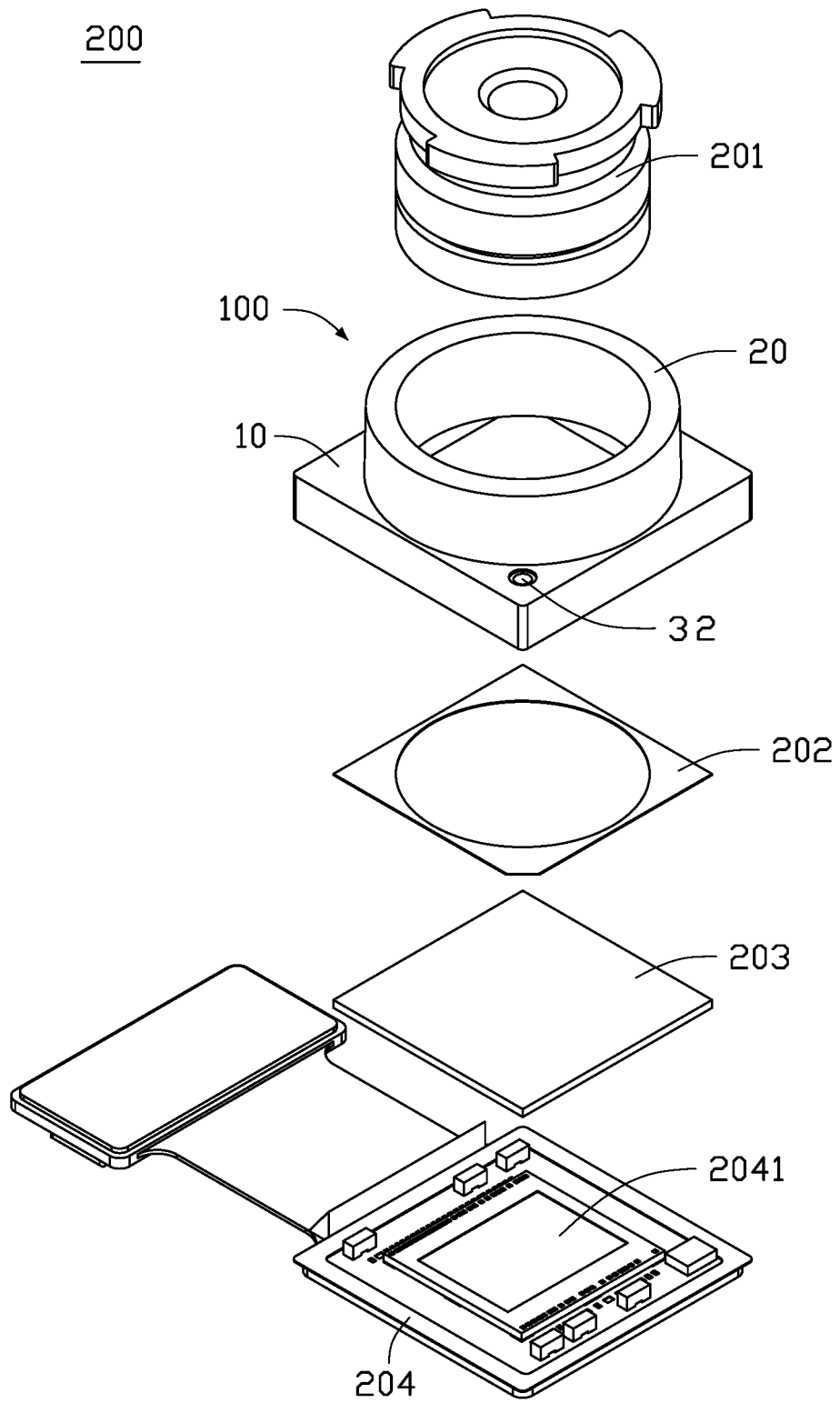
FIG. 6 is an exploded view of the camera module of FIG. 5.

Referring to FIG. 5 and FIG. 6, another embodiment of a camera module 200 includes a lens 201, the lens holder 100, an adhesive layer 202, an optical filter 203, and a circuit board 204.

The lens 201 is received in the lens barrel 20. The optical filter 203 is received in the groove 111 of the lens holder 100, and is connected to the first bottom surface 1111 of the groove 111. The adhesive layer 202 is disposed between the optical filter 203 and the first bottom surface 1111, and connects the optical filter 203 and the first bottom surface 1111 together. The lens holder 100 is mounted on the circuit board 204.

The camera module 200 further includes an image sensor 2041 disposed on the circuit board 204. The image sensor 2041 is also received in the groove 111 and faces the optical filter 203. When the camera module 200 is working, the lens 201 collects light from an object, and such light is filtered by the optical filter 203 and sensed by the image sensor 2041. The image sensor 2041 converts such light into an electrical signal. The electrical signal is then received and processed by the circuit board 204 to form images. In the embodiment, the image sensor 2041 can be a Complementary Metal Oxide Semiconductor (CMOS) sensor or a Charge Coupled Device (CCD) sensor.

Figure 7:
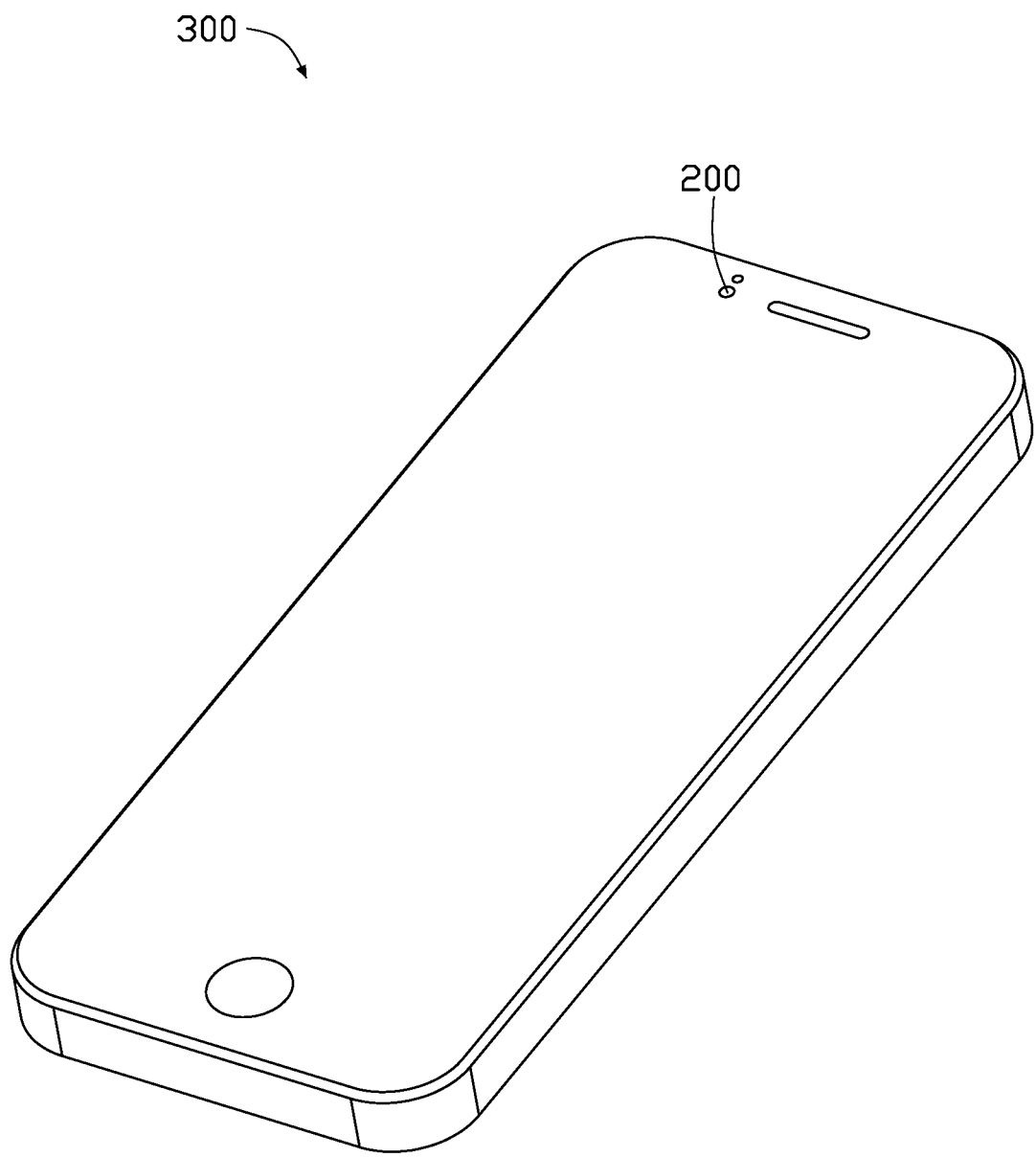
FIG. 7 is an isometric view of an electronic device including the camera module of FIG. 4.

Referring to FIG. 7, another embodiment, of an electronic device 300, includes the camera module 200. The electronic device 300 may be a mobile phone, a tablet computer, or a personal digital assistant (PDA).

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present exemplary embodiments, to the full extent indicated by the plain meaning of the terms in which the appended claims are expressed.

What is claimed is:

1. A lens holder, comprising:
a holder body, wherein the holder body is square; and
a lens barrel disposed on the holder body, wherein the lens barrel is cylindrical, an orthogonal projection of the lens barrel on the holder body is in a center region of the second surface, a center of the orthogonal projection of the lens barrel overlaps with a center of the holder body;
wherein the holder body comprises a first surface away from the lens barrel and a second surface opposite to the first surface, the first surface defines a groove, the groove comprises a first bottom surface, the first bottom surface defines a recess, the recess is disposed at a corner of the holder body away from the center of the orthogonal projection, the recess is entirely rectangular and extends diagonally along the first bottom surface, the recess has a first end and a second end opposite to the first end, the first end is closer to the center of the orthogonal projection with respect to the second end, the first end is spaced apart from the orthogonal projection, the recess comprises a second bottom surface, the second bottom surface defines an air escape hole, the air escape hole is disposed at the first end;
wherein a cross-sectional size of the air escape hole is less than a cross-sectional size of the recess.

2. The lens holder of claim 1, wherein the air escape hole is a frustum of a cone, and the cross-sectional size of the air escape hole increases from the second bottom surface to the second surface.

3. The lens holder of claim 1, wherein the holder body and the lens barrel are integrally formed.

\* \* \* \* \*